United States Patent
Whitaker et al.

(10) Patent No.: US 11,246,390 B2
(45) Date of Patent: Feb. 15, 2022

(54) REMOTE ACCESS AND CONTROL OF A HAIR STYLING DEVICE

(71) Applicants: Lindsey P. Whitaker, Pittsburgh, PA (US); Alexis H. Rojas, Wexford, PA (US)

(72) Inventors: Lindsey P. Whitaker, Pittsburgh, PA (US); Alexis H. Rojas, Wexford, PA (US)

(73) Assignee: Lindsey P. Whitaker, Austin, TX (US)

( * ) Notice: Subject to any disclaimer, the term of this patent is extended or adjusted under 35 U.S.C. 154(b) by 688 days.

(21) Appl. No.: 16/123,077

(22) Filed: Sep. 6, 2018

(65) Prior Publication Data

US 2019/0307221 A1 Oct. 10, 2019

Related U.S. Application Data

(60) Provisional application No. 62/653,294, filed on Apr. 5, 2018, provisional application No. 62/652,690, filed on Apr. 4, 2018.

(51) Int. Cl.
*A45D 6/20* (2006.01)
*A45D 44/00* (2006.01)
(Continued)

(52) U.S. Cl.
CPC .............. *A45D 6/20* (2013.01); *A45D 7/02* (2013.01); *A45D 20/08* (2013.01); *A45D 44/005* (2013.01);
(Continued)

(58) Field of Classification Search
CPC . A45D 6/20; A45D 7/02; A45D 20/08; A45D 44/005; A45D 1/04;
(Continued)

(56) References Cited

U.S. PATENT DOCUMENTS 7,809,786 B2   10/2010   Yoon et al.
8,810,392 B1 *  8/2014   Teller .................... G08B 21/24
                                              340/539.32
(Continued)

FOREIGN PATENT DOCUMENTS

CN   105974858 A    9/2016
CN   205644168 U   10/2016
(Continued)

OTHER PUBLICATIONS

"Your Stove Smarter Your Family Safer", available online at <https://wallflower.com/>, retrieved on Mar. 11, 2019, 6 pages.
(Continued)

*Primary Examiner* — Hai Phan
*Assistant Examiner* — Anthony D Afrifa-Kyei
(74) *Attorney, Agent, or Firm* — Fiala & Weaver P.L.L.C.

(57) ABSTRACT

A hair styling device is described herein that comprises an exposed heating surface, a heating element to heat the exposed heating surface, a temperature sensor to measure a temperature of at least one of the heating element or the exposed heating surface, a heating element interface coupled to the heating element, and a network communication circuit. The hair styling device further comprises a device controller that includes a control circuit to provide a control signal to the heating element interface to modify operation of the heating element according to an instruction received by the network communication circuit over a network from an application. In an embodiment, the device controller further includes a command status monitor to generate a success or fail message, indicative of a success or failure of the instruction in the hair styling device, for transmission by the network communication circuit over the network to the application.

20 Claims, 9 Drawing Sheets

(51) Int. Cl.
*H04L 29/08* (2006.01)
*A45D 20/08* (2006.01)
*G08C 19/00* (2006.01)
*A45D 7/02* (2006.01)
*A45D 6/00* (2006.01)
*A45D 7/00* (2006.01)
*A45D 1/04* (2006.01)

(52) U.S. Cl.
CPC ............ *G08C 19/00* (2013.01); *H04L 67/025* (2013.01); *H04L 67/12* (2013.01); *A45D 1/04* (2013.01); *A45D 2006/005* (2013.01); *A45D 2007/002* (2013.01); *G08C 2201/42* (2013.01)

(58) Field of Classification Search
CPC ........ A45D 2006/005; A45D 2007/002; A45D 1/06; A45D 1/28; A45D 2/001; A45D 2044/007; A45D 20/10; A45D 20/12; A45D 20/40; A45D 2200/00; A45D 2200/155; A45D 2200/205; G08C 19/00; G08C 2201/42; H04L 67/025; H04L 67/12; H04B 7/26; H01M 10/613; H01M 10/00; H01M 10/60; H01M 10/61; H01M 10/623; H01M 10/643; H01M 10/6563; H01M 50/213; H01M 10/6235; H01M 2200/10; H01M 2220/30; F26B 21/001; F26B 21/10; F26B 23/04; F26B 23/06; G08B 21/182; G08B 6/00; G08B 7/06; G08B 3/00; Y02E 60/10
See application file for complete search history.

(56) References Cited

U.S. PATENT DOCUMENTS

| | | | |
|---|---|---|---|
| 9,808,061 B2* | 11/2017 | Ford | A45D 2/001 |
| 10,061,288 B2* | 8/2018 | Jablokov | G07C 3/00 |
| 2010/0281636 A1* | 11/2010 | Ortins | A46B 15/0012 15/4 |
| 2016/0087554 A1* | 3/2016 | Nohra | G05B 13/024 700/287 |
| 2016/0219141 A1* | 7/2016 | Kant | H04M 1/72415 |
| 2017/0163437 A1* | 6/2017 | Yang | F24C 7/082 |
| 2018/0027940 A1* | 2/2018 | Goldman | F26B 23/06 |
| 2018/0125296 A1 | 5/2018 | Gafford | |
| 2019/0098978 A1* | 4/2019 | Thiebaut | A46B 15/0038 |

FOREIGN PATENT DOCUMENTS

| | | |
|---|---|---|
| KR | 10-2019-0015651 A | 2/2019 |
| WO | 2016/187840 A1 | 12/2016 |

OTHER PUBLICATIONS

Whitaker, Lindsey "SYRION: Smart Flat Iron You Can Turn Off From Anywhere", available online at <https://www.kickstaiter.com/projects/603038959/syiron-smart-flat-iron-y . . . >, retrieved on Mar. 11, 2019, 9 pages.

Janardhanan, Bijumon "Smart Iron", available online at <https://www.indiegogo.com/projects/smart-iron>, retrieved on Mar. 11, 2019, 4 pages.

* cited by examiner

1200

Generate a success or fail message for transmission indicative of a success or failure of the instruction in the hair styling device for transmission over the network to the HSD Application — 1202

Determine an on/off status of the hair styling device indicating at least one of: an indication of whether the hair styling device is powered on; or an amount of time the hair styling device has been powered on — 1302

Obtain a location of the hair styling device — 1402

FIG. 14

REMOTE ACCESS AND CONTROL OF A HAIR STYLING DEVICE

CROSS-REFERENCE TO RELATED APPLICATION

This application claims priority to U.S. Provisional Patent Application No. 62/652,690, filed Apr. 4, 2018 and entitled "Mobile application that controls the function of heated device with an open heated surface such as curling iron, flat iron, curling wand," and to U.S. Provisional Patent Application No. 62/653,294, filed Apr. 5, 2018 and entitled "Device with an exposed heated surface that can connect to wifi, enabling temperature control, and powering off and on from a mobile application," both of which are incorporated by reference herein in their entireties.

BACKGROUND

Technical Field

The subject matter described herein relates to a system for remotely communicating with and controlling a hair styling device.

Description of Related Art

Hair styling devices are electronic devices that use electricity to heat a surface that is used to shape the hair of a user of the device. For example, curling irons and curling wands each include a heated cylinder, around which hair is wrapped, that is used to heat the hair to add curls or waves. A flat iron includes opposing surfaces (flat or slightly curved), between which hair is compressed, that are used to heat the hair for straightening. Such hair styling devices typically plug into a power outlet to receive electricity for power, and are controlled manually by one or more buttons or switches.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, computing devices, and computer program products are provided for enabling remote access and control of a hair styling device. A hair styling device includes an exposed heating surface, a heating element to heat the exposed heating surface, a temperature sensor to measure a temperature of at least one of the heating element or the exposed heating surface, a heating element interface coupled to the heating element, and a network communication circuit. The hair styling device further comprises a device controller that includes a control circuit to provide a control signal to the heating element interface to modify operation of the heating element according to a received instruction. This instruction may be received by the network communication circuit over a network from a hair styling device (HSD) management application.

The device controller may further include a command status monitor to generate a success or fail message indicative of a success or failure of the instruction in the hair styling device. The message may be transmitted by the network communication circuit over the network to the application.

In a further aspect, a user device includes an HSD management application. The HSD management application includes a status monitor that receives, via a network communication circuit of the user device, a status profile corresponding to a hair styling device. The status profile includes at least an on/off status of the hair styling device. The status monitor displays the status profile in a user interface of the user device. The HSD management application further includes a hair styling device manager that receives an instruction input to the user interface to modify an operation of the hair styling device.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 12 shows a flowchart of a process for generating a success or fail message for a hair styling device, according to an example embodiment.

FIG. 13 shows a flowchart of a process for determining an on/off status of a hair styling device, according to an example embodiment.

FIG. 14 shows a flowchart of a process for obtaining a location of a hair styling device, according to an example embodiment.

Figure 1A:
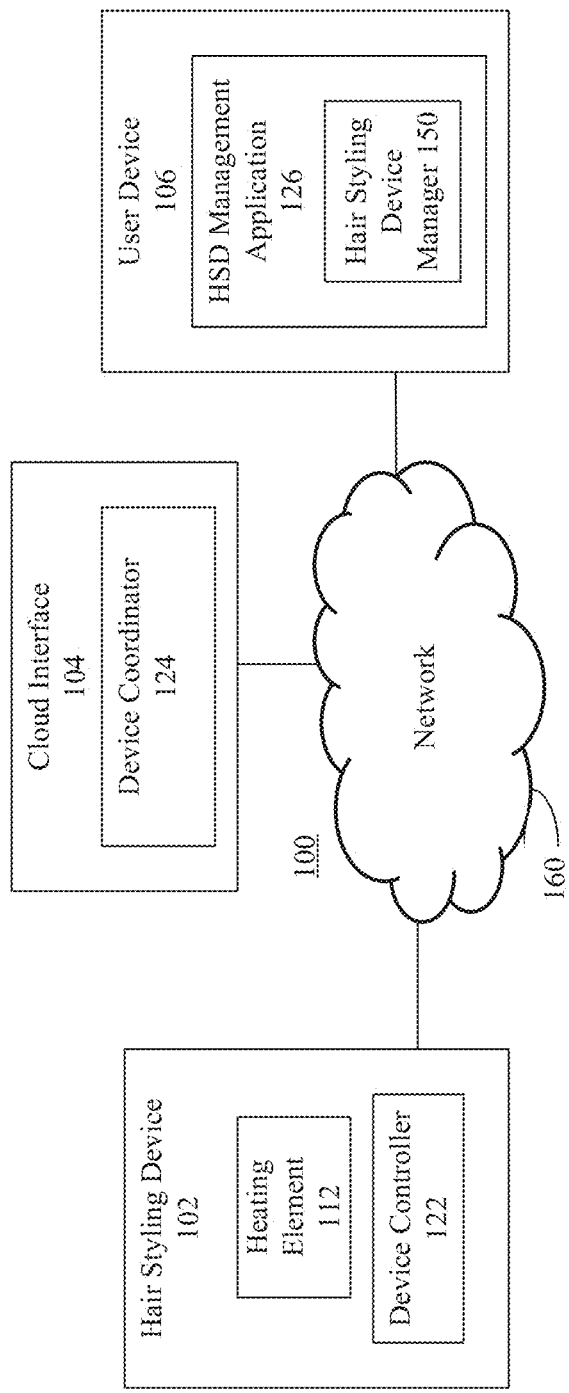
FIG. 1A shows a block diagram of a system for enabling remote access and control of a hair styling device, according to an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

II. Example Embodiments

Hair styling devices are electronic devices that use electricity to heat a surface that is used to shape the hair of a user of the device. For example, curling irons and curling wands each include a heated cylinder, around which hair is wrapped, that is used to heat the hair to add curls or waves. A flat iron includes opposing surfaces (flat or slightly curved) between which hair is compressed, which are used to heat the hair for straightening. Such hair styling devices typically plug into a power outlet to receive electricity for power, and are controlled manually by one or more buttons or switches.

Users typically use a hair styling device at a location and then leave that location. If the hair styling device is left powered on when the user leaves, the hair styling device may continue to heat, which could lead to a damaging fire being started. Furthermore, even if the user did power off the hair styling device before leaving, the user might not remember whether they powered off the hair styling device, and thus might worry. Conventionally, when a user is unsure if the hair styling device was powered off, the user must return to the location to check whether they left power on for the hair styling device. While some hair styling devices include an auto shut off setting, auto shut off settings may take a while (a predetermined time period) to initiate a shut off, and even if the auto shut off successfully initiates, the user has no way of knowing that the auto shut off worked.

Embodiments overcome these and other issues related to conventional hair styling devices. In embodiments, a hair styling device (HSD) management application runs on a user device, and communicates with a hair styling device via a network. The HSD management application in the user device is used to remotely access and control the hair styling device. In this way, operational characteristics of the hair styling device are enabled to be remotely managed, providing for safety (e.g., avoiding potential fires), reducing power consumption (by hair styling devices inadvertently left powered on), increased hair styling device lifetime (by preventing extended times of heating), and reducing user worry, in a novel fashion.

In an embodiment, the HSD management application is configured to execute in a user device and includes a user interface that enables a user of the user device to initiate modifications of the hair styling device. The HSD management application receives an instruction input, via the user interface, to modify an operation of the hair styling device and transmits the instruction to the hair styling device over a network. A device controller of the hair styling device receives the instruction and provides a control signal to modify operation of a heating element of the hair styling device according to the instruction. The device controller then generates a result message indicating the result of the instruction (e.g., indicating whether the heating element modified its operation successfully) with respect to the hair styling device and transmits the result message to the HSD management application for display to the user via the user interface of the user device.

In embodiments, the HSD management application is configured to enable a user of the user device to view information related to the hair styling device. For instance, a device controller of the hair styling device may transmit a status message including a status profile to a status monitor of the user device. The status monitor displays the status profile to the user via the user interface. The status profile may include various information regarding the hair styling device, such as whether the hair styling device is powered on or off, how long the hair styling device has been powered on, an indication of the current temperature of the hair styling device, or an indication of the location of the hair styling device.

In embodiments, the HSD management application is further configured to alert a user that the user device has exceeded a predetermined distance from the hair styling device, or to automatically transmit an instruction to power off (turn off) the hair styling device. For instance, the HSD management application may transmit a location of the user device to a server. The hair styling device may transmit its location (e.g., determined by a location sensor) to the server. The server may compare the location of the user device to the location of the hair styling device to determine if the distance between the hair styling device and the user device exceeds a predetermined distance. In response to determining that the distance exceeds the predetermined distance, the server may transmit a distance exceeded alert to hair styling device manager. The hair styling device manager displays the alert to the user via the user interface. Alternatively, or additionally, the hair styling device manager may transmit a power-off instruction to the hair styling device over the network. In certain embodiments, the server may transmit the power-off instruction to the hair styling device over the network.

Example embodiments are described as follows that are directed to techniques for enabling a user device to access and control a hair styling device. For instance, FIG. 1A shows a block diagram of a system 100 for enabling remote access and control of a hair styling device, according to an example embodiment. As shown in FIG. 1, system 100 includes a hair styling device 102, a cloud interface 104, and a user device 106 which are all communicatively connected via one or more network(s) 160. Hair styling device 102 includes a heating element 112 and a device controller 122. Cloud interface 104 includes a device coordinator 124. User device 106 includes a HSD management application 126, which includes a hair styling device manager 150. These features of system 100 are described as follows.

User device 106 may represent any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as an Apple iPhone, a phone implementing a Google® Android™ operating system, a Palm® device, a Blackberry® device, etc.), a wearable computing device (e.g., a smart watch, a head-mounted device including smart glasses such as Google® Glass™, etc.), or other type of mobile device (e.g., an automobile), or a stationary computing device such as a desktop computer or PC (personal computer), a portable media player, a stationary or handheld gaming console, a personal navigation assistant, a camera, or other type of stationary or mobile device.

Hair styling device 102 may represent any type of hair styling device that includes a heating element, including but not limited to, any heated styling device such as, a flat iron, a curling iron, or a heated brush. Cloud interface 104 may be formed of one or more computing devices that enable communications between devices and/or that are capable of serving information and/or providing other services. Cloud interface 104 may include any number of individual server devices, including tens, hundreds, and thousands of servers. Hair styling device 102 and user device 106 may each include at least one network interface that enables communications over network 160. Network 160 may comprise one or more networks such as local area networks (LANs), wide area networks (WANs), enterprise networks, the Internet, etc., and may include one or more of wired and/or wireless portions.

HSD management application 126 in user device 106 represents an application (e.g., implemented in computer code executed by a processor, programmed according to any suitable programming language and/or scripting language, such as C++, C#, HTML (hypertext markup language), JavaScript, etc.) configured to communicate with hair styling device 102, and to provide a user interface for a user at the corresponding device. Hair styling device manager 150 is configured to enable a user of a user device to remotely access and control a hair styling device. For instance, hair styling device manager 150 enables the user of user device 106 to remotely control hair styling device 102.

Device coordinator 124 is configured to enable access and control of the hair styling device by the user device and store information related thereto. For instance, device coordinator 124 enables access and control of hair styling device 102 by user device 106. Heating element 112 of hair styling device 102 represents a heating element configured to heat an exposed heating surface of hair styling device 102, as discussed hereinafter. Device controller 122 is configured to receive instructions to modify the operation of a hair styling device. For instance, device controller 122 receives instructions from HSD management application 126 to modify the operation of heating element 112 and thus, provides a corresponding control signal to modify the operation of heating element 112. In an embodiment, device controller 122 is an internal part of hair styling device 102. Alternatively, device controller 122 is an external part of hair styling device 102. These features of system 100 are discussed in more detail elsewhere herein.

Figure 1B:
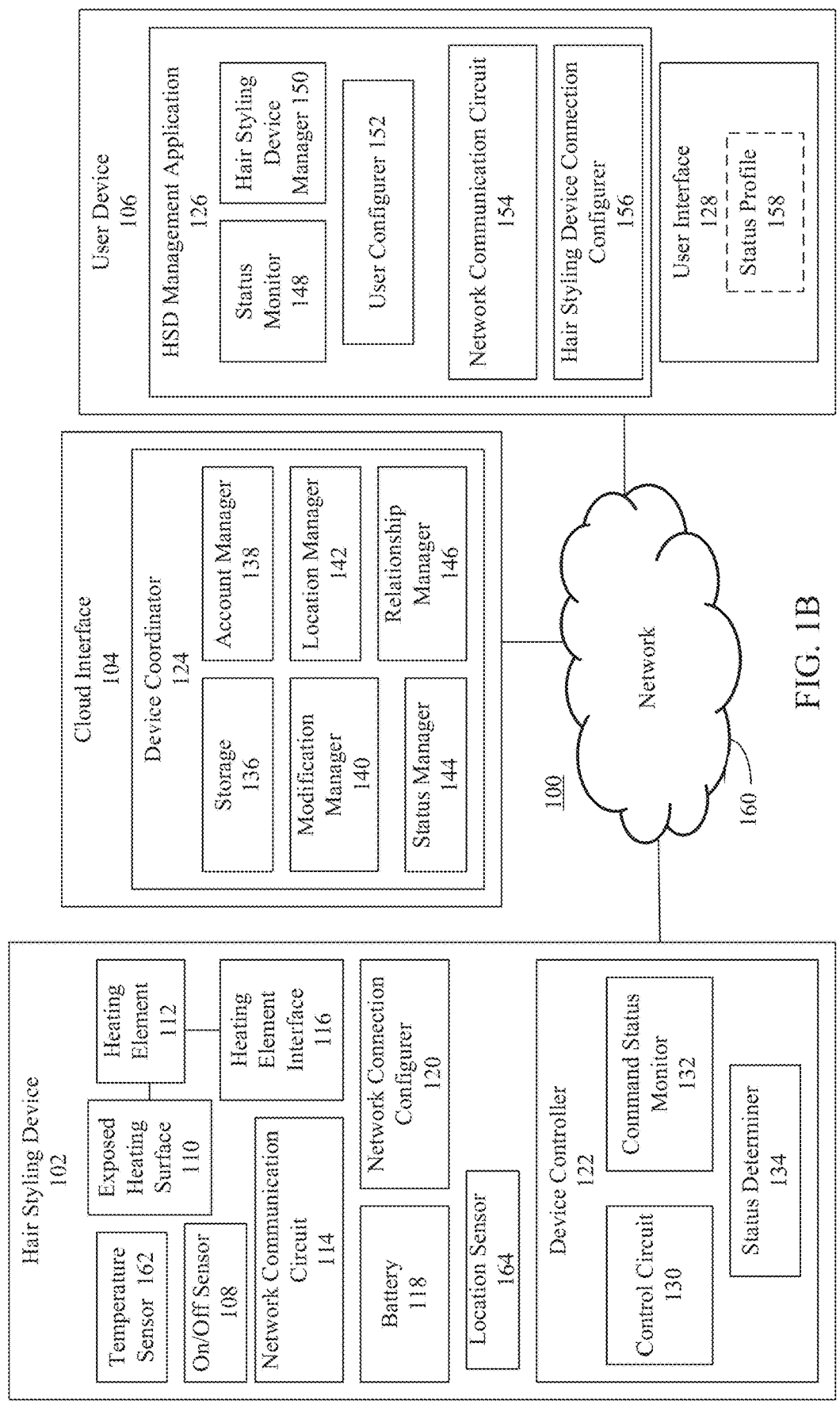
FIG. 1B shows a further detailed block diagram of the system of FIG. 1A, according to an embodiment.

For instance, FIG. 1B shows a more detailed block diagram of system 100 of FIG. 1A, according to an embodiment. As shown in FIG. 1A, system 100 includes hair styling device 102, cloud interface 104, user device 106, heating element 112, device controller 122, device coordinator 124, HSD management application 126, and hair styling device manager 150, all communicatively coupled by network 160, of FIG. 1A. These elements are configured to operate in a substantially similar manner as those described with respect to FIG. 1A.

Furthermore, and as shown in FIG. 1B, hair styling device 102 further includes an on/off sensor 108, an exposed heating surface 110, a network communication circuit 114, a heating element interface 116, a battery 118, a network connection configurer 120, a temperature sensor 162, and a location sensor 164. Device controller 122 includes a control circuit 130, a command status monitor 132, and a status determiner 134. Device coordinator 124 includes storage 136, an account manager 138, a modification manager 140, a location manager 142, a status manager 144, and a relationship manager 146. HSD management application 126 further includes a status monitor 148, a user configurer 152, a network communication circuit 154, and a hair styling device connection configurer 156. User device 106 further includes a user interface 128 that is enabled to display a status profile 158. In embodiments, any combination of these components may be present hair styling device 102, cloud interface 104, and user device 106, including fewer of the components shown in FIG. 1B, and/or additional or alternative components. For example, additional features may be included in hair styling device 102, such as a motion sensor to detect movement of hair styling device 102. These further features of system 100 are described as follows.

As noted above, device coordinator 124 is configured to enable access and control of hair styling device 102 by user device 106 after a pair relationship is established between hair styling device 102 and user device 106. Relationship manager 146 is configured to enable the initiation of such a pair relationship. For instance, relationship manager 146 enables the initiation of a pairing between hair styling device 102 and user device 106. Hair styling device connection configurer 156 is configured to interface with a hair styling device via a server to establish a relationship. For instance, hair styling device connection configurer 156 interfaces with hair styling device 102 via relationship manager 146 to establish a pair relationship with hair styling device 102. Network connection configurer 120 is configured to interface with a user device to establish a pair relationship. For instance, network connection configurer 120 interfaces with hair styling device connection configurer 156 via relationship manager 146 to establish the relationship. As noted above, user device and hair styling device each include at least one network interface that enables communications over network 160. For instance, network communication circuit 114 and network communication circuit 154 are respectively configured to enable communication of hair styling device 102 and user device 106 over network 160.

In order for a user of a user device to initiate a relationship with a hair styling device, and access or control that hair styling device, the user may first set up or sign in to an account. User configurer 152 is configured to enable the user set up such an account. For instance, user configurer 152 enables the user to set up an account via user interface 128 and transmits the user account information to device coordinator 124. Account manager 138 is configured to manage the user account information of the user of a user device. For instance, account manager 138 receives the user account information from user configurer 152. Storage 136 is configured to store information related to the hair styling device and the user device. For instance, storage 136 stores information related to hair styling device 102 and user device 106, including the user account information and, as discussed hereinafter, a unique ID (identifier) of hair styling device 102. In embodiments, the user may further set up a hair profile including attributes for their hair such that a recommended temperature for hair styling device 102 may be provided to the user by device coordinator 124. This recommendation may be based on external data or data provided by other users.

As noted above, once a relationship is established, the user of a user device may view information related to a hair styling device. Status determiner 134 is configured to determine a status of operational characteristics of a hair styling device to include in a status profile and transmit a status message including the status profile to user device. For instance, status determiner 134 determines a status of operational characteristics of hair styling device 102 to include in a status profile and transmits a status message including the status profile to user device 106. Examples of operational characteristics of the hair styling device that are included in the status profile are a temperature of a heating element or an exposed heating surface of the hair styling device, an indication of whether the hair styling device is powered on, an amount of time the hair styling device has been powered on, or a location of the hair styling device.

Exposed heating surface 110 represents an exposed surface of hair styling device 102 that is capable of being heated. For instance, in a flat iron, the exposed heating surface is the heated portion that contacts the user's hair. In a curling iron, the exposed heating surface is the surface of the cylinder around which the user's hair is coiled. Heating element 112 is configured to heat exposed heating surface 110. For example, heating element 112 may include a resistive metal component that heats when conducting electrical current, or may be configured in another manner to generate heat. The heat is generated by heating element 112 in exposed heating surface 110, or is conducted from heating element 112 to exposed heating surface 110. If heating element 112 is turned to a high temperature, exposed heating surface 110 heats to a relatively high temperature. Heating element interface 116 is configured to control heating element 112 and thus, control exposed heating surface 110. For instance, if heating element interface 116 receives a control signal to turn heating element 112 off, heating element 112 will turn off (power off) and thus, exposed heating surface 110 stops heating and cools to room temperature. In sum, heating element interface 116 interfaces with heating element 112 to control a temperature of exposed heating surface 110.

Status determiner 134 is configured to determine the status (e.g., operational characteristics) of a hair styling device in various ways. For instance, and as shown in FIG. 1B, temperature sensor 162 is configured to determine a temperature of a hair styling device. For example, temperature sensor 162 may include a thermistor, a thermocouple, a resistance thermometer, a silicon bandgap temperature sensor, or other type of temperature sensor. Status determiner 134 may receive a temperature signal from temperature sensor 162 that provides an indication of a temperature associated with hairs styling device 102, depending on the location of temperature sensor 162 (e.g., attached to heating element 112, attached to exposed heating surface 110, etc.).

On/off sensor 108 is configured to determine information related to an on/off status of a hair styling device. For example, on/off sensor 108 may include an electrical subsystem such as a voltage sensor or current sensor that measures whether a voltage or current is present and applied to heating element 112. Alternatively, on/off sensor 108 may be configured to detect a position of an on-off switch of hair styling device 102. Status determiner 134 may receive an on/off indication signal from on/off sensor 108 that provides an indication of whether hair styling device 102 is powered on or off.

Furthermore, as shown in FIG. 1B, location sensor 164 is configured to determine a location of a hair styling device. Location sensor 164 may include or access one or more sensors that determine a geographical location of hair styling device 102. The current location of hair styling device 102 may be determined by location sensor 164 in various ways, including using GPS (global positioning system) techniques, local positioning systems (e.g., using cellular base stations, Wi-Fi access points, radio towers, etc.), and/or using other positioning techniques, as would be known to persons skilled in the relevant art(s). Status determiner 134 may receive a location indication signal from location sensor 164 that provides an indication of the location of hair styling device 102. Note that location sensor 164 may include a motion sensor that detects whether hair styling device 102 is moved, which may trigger location sensor 164 to detect a changed location of hair styling device 102. Alternatively, location sensor 164 may periodically determine a location of hair styling device 102, or do so when an instruction to do so is received from status determiner 134 or status manager 144 (of device coordinator 124 in cloud interface 104).

As such, the status profile determined and maintained by status determiner 134 in hair styling device 102 may indicate one or more of an on/off status of hair styling device 102, a temperature of heating element 112 and/or exposed heating surface 110, a location of hair styling device 102, and/or further characteristics of hair styling device 102 of interest.

Status manager 144 of device coordinator 124 is configured to receive and transmit a status message including the status profile from a hair styling device to a user device. For instance, status manager 144 receives the status message from status determiner 134 of device controller 122 of hair styling device 102. Status manager 144 then transmits the status message to status monitor 148 of user device 106. Status monitor 148 is configured to receive the status message and display the status profile to the user. For instance, and as shown in FIG. 1B, status monitor 148 receives the status message and displays status profile 158 via user interface 128.

As further noted above, the HSD management application is configured to enable the user to initiate modification of hair styling device. Hair styling device manager 150 is configured to receive an instruction input from the user and transmit the instruction to the device coordinator. Modification manager 140 of device coordinator 124 is configured to receive and manage a modification request from a user device. For instance, hair styling device manager 150 receives an instruction input from the user and transmits the instruction to modification manager 140. In embodiments, the user may input an instruction input via user interface 128 and the instruction input may include an instruction to modify an operation of hair styling device 102. Modification manager 140 then transmits the instruction to control circuit 130 of hair styling device 102. Control circuit 130 is configured to receive the instruction and provide a control signal according to the instruction. For instance, control circuit 130 receives the instruction and provides the control signal to heating element 112 via heating element interface 116 according to the instruction. For example, if the instruction is a power-off command for hair styling device 102, control circuit 130 transmits a control signal to heating element interface 116 to power off heating element 112. Furthermore, if the instruction is a power-on (turn on) command for hair styling device 102, control circuit 130 transmits a control signal to heating element interface 116 to turn on heating element 112. Additionally, if the instruction is a modify temperature command, such as a command to change the temperature of hair styling device 102 up or down by a specified amount (e.g., in degrees Fahrenheit or Celsius), control circuit 130 transmits a control signal to heating element interface 116 to turn up or down the heat of heating element 112.

As noted above, in response to receiving the instruction, the device controller is further configured to generate and transmit a result message back to the user device. Command status monitor 132 of device controller 122 is configured to generate a result message to transmit to the device coordinator. For instance, command status monitor 132 generates a result message and transmits it to status manager 144 of device coordinator 124. The result message may be a success message indicating a success of the instruction in hair styling device 102. Alternatively, the result message may be a fail message indicating a failure of the instruction in hair styling device 102. In either case, status manager 144 is configured to transmit the result message back to the user device 106. For instance, status manager 144 transmits the status message to hair styling device manager 150 for display to the user via user interface 128.

In some embodiments, the user may enable customized settings to power off the hair styling device in certain circumstances. For instance, the user may require that if the hair styling device does not move for 15 minutes, as determined by a motion sensor in the hair styling device (e.g., location sensor 164), a power off notification should be generated and used to power off the hair styling device. Examples of motion sensors include a passive infrared sensor, an active sensor, a vibration sensor a beam sensor, etc. In the motion sensor detects that the hair styling device does not move for the predetermined amount of time, the motion sensor may generate a power-off indication that is received by device controller 122. In response, device controller 122 powers off hair styling device 102.

Furthermore, and as noted above, the system is further configured to alert the user that the user device has exceeded a predetermined distance from the hair styling device or automatically transmit an instruction to turn of the hair styling device. Location manager 142 is configured to manage location information. For instance, location manager 142 manages location information related to user device 106 and hair styling device 102 and determines whether the user device has exceeded a predetermined distance. In an embodiment, the predetermined distance is configurable by the user. Location sensor 164 is configured to transmit the location of the hair styling device to the device coordinator. For instance, location sensor 164 transmits the location of hair styling device 102 to location manager 142. Hair styling device manager 150 is configured to transmit a location of the user device to the device coordinator. For instance, hair styling device manager 150 transmits a location of user device 106 to location manager 142. In embodiments, if it is determined user device 106 has exceed a predetermined distance from hair styling device 102, location manager 142 transmits a distance exceeded alert to status monitor 148. Status monitor 148 may display the distance exceeded alert via user interface 128 or may automatically transmit a power-off instruction to control circuit 130 via modification manager 140. Alternatively, or additionally, location manager 142 may transmit a power-off instruction to control circuit 130.

In embodiments, the hair styling device includes a battery to provide power in addition to an external power source. For instance, as shown in FIG. 1B, battery 118 may be present in hair styling device. Battery 118 may include one or more batteries/cells capable of being charged and providing power to the electrical components of hair styling device 102. In the event that hair styling device is disconnected from an external power source, battery 118 provides power to hair styling device 102. In this way, even if hair styling device 102 is not receiving external (e.g., A/C) power, hair styling device 102 is still capable of determining its own status, providing status information to device coordinator 124, receiving instructions from device coordinator 124, enacting received instructions, and providing result information. For example, even if hair styling device 102 is unplugged and not connected to Wi-Fi, status monitor 134 is still enabled to determine a status profile, which may indicate to device controller 122 to power off hair styling device 102 (e.g., heating element 112 is generating heat when hair styling device 102 is not in use, etc.).

Figure 2:
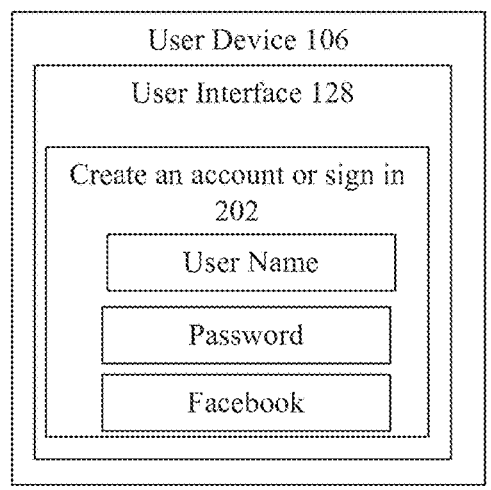
FIG. 2 shows a block diagram of a user interface of a user device in which the HSD management application is initiated, according to an example embodiment.

As described above, user device 106 is enabled to access and control hair styling device 102 by HSD management application 126 via device coordinator 124. The access and control may be enabled by communication over network 160, as described in greater detail hereinafter. Furthermore, prior to a user of user device 106 being able to use HSD management application 126, the user may be required to sign in or setup an account. For instance, FIG. 2 shows a block diagram 200 of a user interface of a user device in which the HSD management application is initiated, according to an example embodiment. As shown in FIG. 2, user device 106 includes user interface 128 which displays a create an account or sign in page 202 to the user. For instance, as shown in FIG. 2, page 202 may include the following fields: User Name, Password, and Facebook. Further or alternative fields may be present. In the example of FIG. 2, the user signs in with a user name and password.

Figure 3:
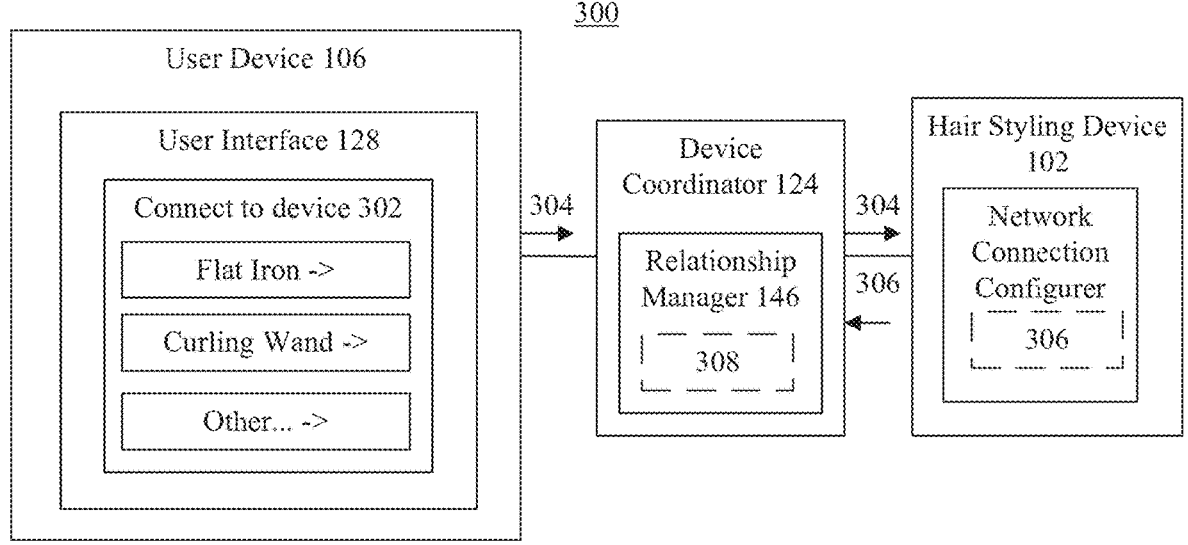
FIG. 3 shows a block diagram of a system that includes a user device, device coordinator, and a hair styling device, according to an example embodiment.

Referring now to FIG. 3, FIG. 3 shows a block diagram 300 in which a relationship is created between a user device and a hair styling device, according to an example embodiment. As shown in FIG. 3, once the user signs in to HSD management application 126 via page 202, the user can set up a relationship with or pair a hair styling device. As shown in FIG. 3, user device 106 includes user interface 128 which displays a connect to device page 302. Page 302 may display any hair styling device that is capable of being paired with user device 106 obtained by a service call to find Wi-Fi enabled devices and read PCB data. For instance, as shown in FIG. 3, page 302 may include the following fields: flat iron, curling wand, or other (other hair styling device type). Further or alternative fields may be present. In the example of FIG. 3, flat iron represents hair styling device 102 and the user makes a selection of flat iron.

In response to the user selecting flat iron, and with continued reference to FIG. 1B, hair styling device connection configurer 156 transmits a pair request 304 to relationship manager 146. Relationship manager 146 interfaces with network connection configurer 120 of hair styling device 102 to receive a device ID 306 that corresponds to hair styling device 102 and set up the relationship. As such, relationship manager 146 acknowledges the paired relationship between user device 106 and hair styling device 102, and stores information related to the pair relationship in relationship information 308 (e.g., storing device ID 306 of hair styling device 102 in association with an identifier for user device 106, etc.).

Figure 4:
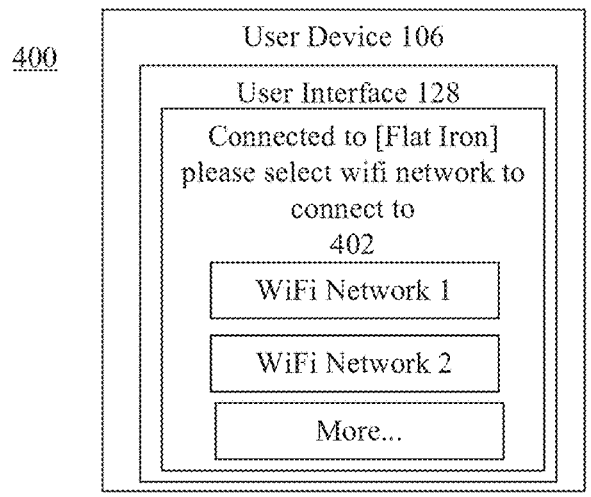
FIG. 4 shows a block diagram of a user interface of a user device in which a Wi-Fi network is selected for a paired hair styling device, according to an example embodiment.

Referring now to FIG. 4, once a relationship is established between user device 106 and hair styling device 102, Wi-Fi is enabled to be set up for hair styling device 102. For instance, FIG. 4 shows a block diagram 400 of a user interface of a user device in which a Wi-Fi network is selected for a paired hair styling device, according to an example embodiment. As shown in FIG. 4, once the user signs in to the application and pairs a hair styling device, the user can connect the hair styling device to Wi-Fi. For instance, as shown in FIG. 4, user device 106 includes user interface 128 which displays connected to [Flat Iron] please select Wi-Fi network to connect to page 402. As shown in FIG. 4, page 402 may include the following fields: Wi-Fi Network 1, Wi-Fi Network 2, or More. Further or alternative fields may be present. In the example of FIG. 4, the user selects Wi-Fi Network 1.

Figure 5:
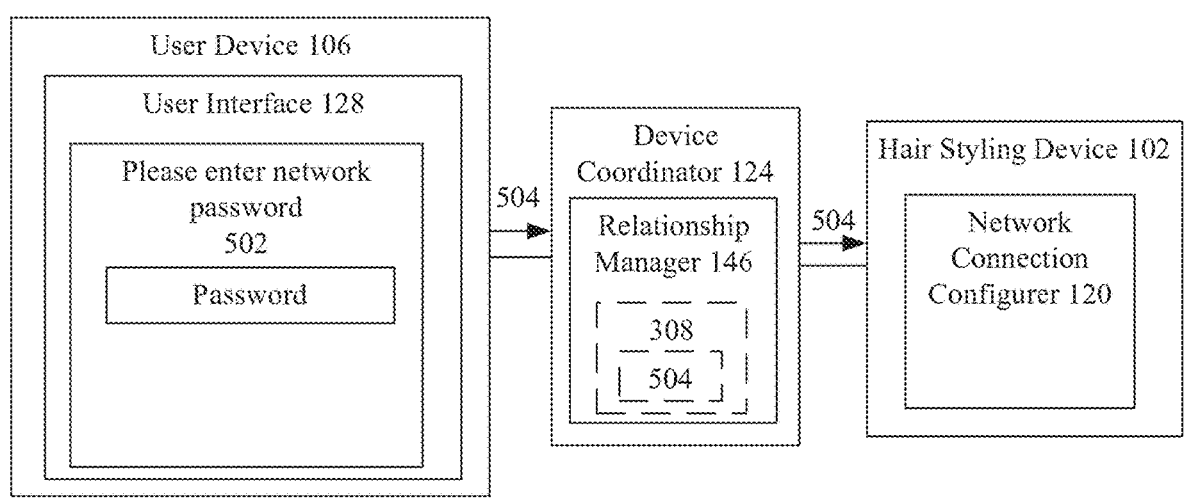
FIG. 5 shows a block diagram of a system that includes a user device, device coordinator, and a hair styling device in which Wi-Fi is set up for the hair styling device, according to an example embodiment.

Referring now to FIG. 5, FIG. 5 shows a block diagram 500 in which Wi-Fi is set up for a hair styling device paired with a user device, according to an example embodiment. As shown in FIG. 5, once the user selects the Wi-Fi network to connect to the hair styling device, the user needs to enter the network password. For instance, as shown in FIG. 5, user device 106 includes user interface 128 which displays a please enter network password page 502 such that the user can enter the password for Wi-Fi Network 1. For instance, as shown in FIG. 5, page 502 may include the following field: password. Further or alternative fields may be present.

In response to the user entering the password for Wi-Fi Network 1, and with continued reference to FIG. 1B, network connection configurer 120 transmits the password and details (e.g., relationship information 308) to relationship manager 146. Relationship manager 146 transmits Wi-Fi details to network connection configurer 120 of hair styling device 102 to set up Wi-Fi for hair styling device 102. As a result, hair styling device 102 and user device 106 are enabled to communicate with each other over the Wi-Fi connection via network communication circuit 114 and network communication circuit 154, respectively. User device 106 and hair styling device 102 may communicate with each other directly, or through cloud interface 104, as described herein. Furthermore, Wi-Fi details 504 are stored with relationship information 308.

Figure 6:
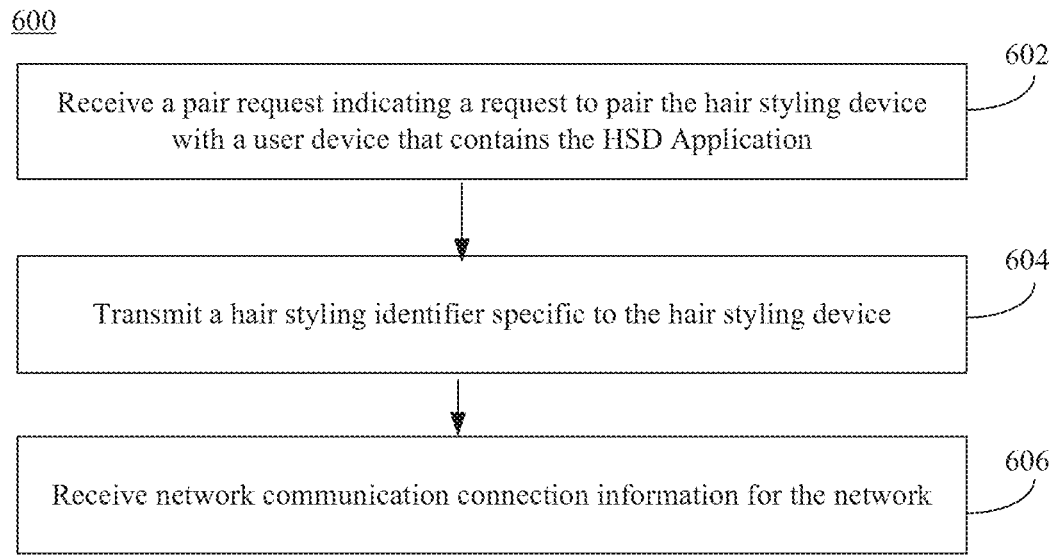
FIG. 6 shows a flowchart of a process for pairing a user device and a hair styling device, according to an example embodiment.

Accordingly, in embodiments, network connection configurer 120 is configured to pair hair styling device 102 with user device 106 via device coordinator 124. Network connection configurer 120 may perform this pairing in various ways. For instance, FIG. 6 shows a flowchart 600 for creating a relationship between a user device and a hair styling device, according to an example embodiment. In an embodiment, flowchart 600 may be implemented by network connection configurer 120. FIG. 6 is described as follows with continued reference to system 100 in FIG. 1B. Other structural and operational embodiments will be apparent to persons skilled in the relevant art(s) based on the following discussion regarding flowchart 600 and system 100.

Flowchart 600 begins with step 202. In step 602, a pair request indicating a request to pair the hair styling device with a user device that contains the HSD management application is received. For example, with reference to FIG. 1B and FIG. 3, network connection configurer 120 receives pair request 304 from hair styling device connection configurer 156. Pair request indicates a request to pair user device 106 containing HSD management application 126 with hair styling device 102.

In step 604, a hair styling identifier specific to the hair styling device is transmitted to the hair styling device. For instance, with reference to FIG. 1B and FIG. 3, network connection configurer 120 transmits device ID 306 to relationship manager 146 of device coordinator 124.

In step 606, network communication connection information is received for the network. For instance, with reference to FIG. 1B and FIG. 5, network connection configurer 120 receives Wi-Fi details 504 for network 160 from hair styling device connection configurer 156 via relationship manager 146.

As described above, once a hair styling device is paired with a user device having an HSD management application, a user is enabled to access and control the paired hair styling device. For instance, a status manager, such as status determiner 134 of FIG. 1, generates and transmits the status of hair styling device 102 to HSD management application 126 to be displayed in user interface 128. Such a status determiner 134 may be configured in various ways and may perform its functions in various ways.

Figure 7:
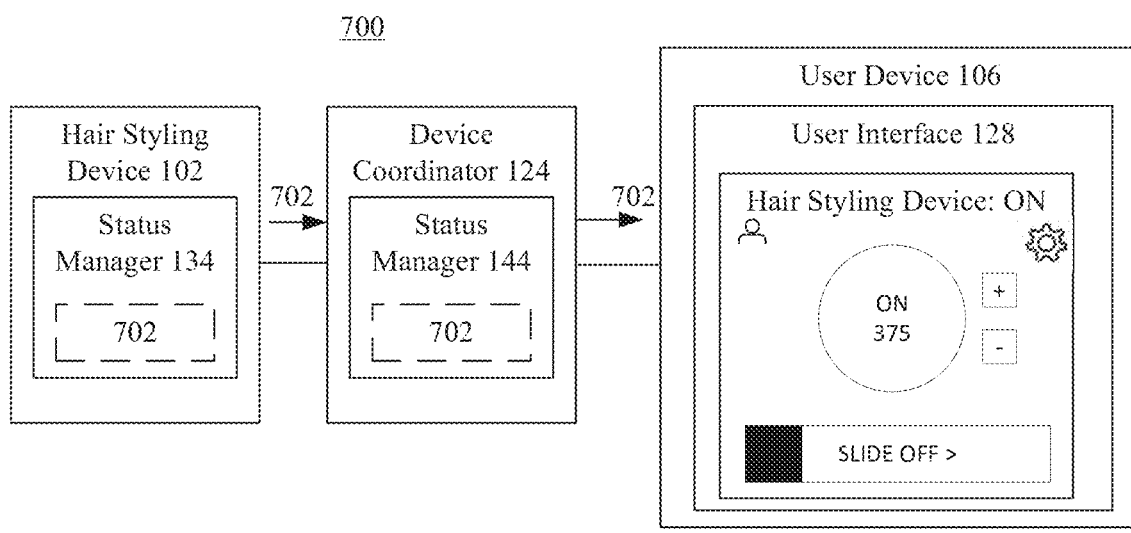
FIG. 7 shows a block diagram of a system that includes a user device, device coordinator, and a hair styling device in which a status profile of the hair styling device is transmitted to and displayed on a user interface of the paired user device, according to an example embodiment.

For instance, FIG. 7 shows a block diagram 700 in which a status profile of a hair styling device is transmitted to and displayed on a user interface of a paired user device, according to an example embodiment. As shown in FIG. 1, hair styling device 102 transmits a status message 702 including a status profile of hair styling device 102. For instance, and with reference to FIG. 1B, status determiner 134 may generate and transmit status message 702 to status manager 144. In embodiments, the status profile indicates the on/off status of the hair styling device, the temperature of the heating element or the exposed heating surface or the location of the hair styling device. Once status message 702 is received by status manager 144, status manager transmits status message 702 to status monitor 148 which displays the status profile in user interface 128.

For instance, as shown in FIG. 7, user device 106 includes user interface 128 which displays the interface for viewing the status of hair styling device 102. For instance, as shown in FIG. 7, the interface page may include the following fields: the ON/OFF status, a temperature+/−buttons, an interactive and current temperature, an account button, a help button, and an interactive slider. The user may interact with the interface page to modify operations of hair styling device 102.

Figure 8:
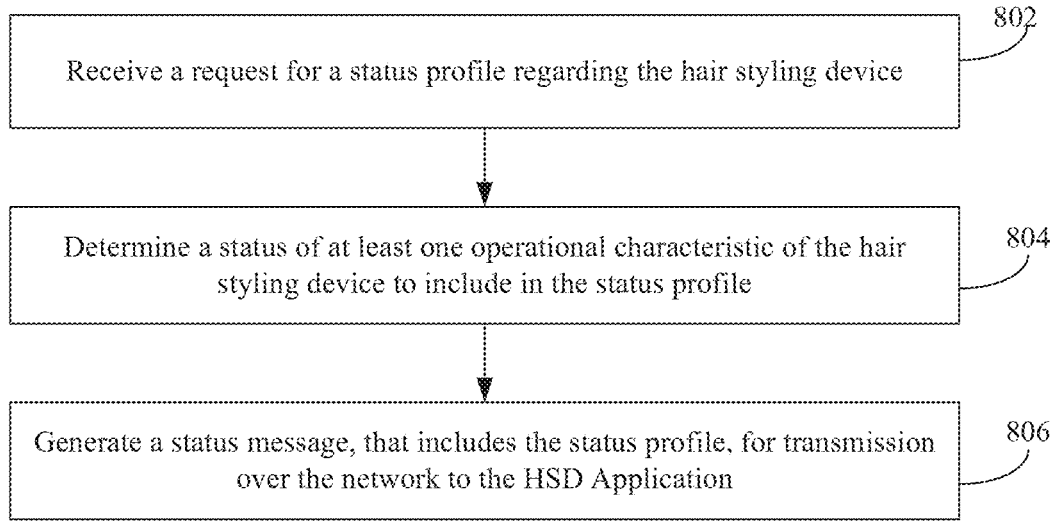
FIG. 8 shows a flowchart of a process for generating a status message including a status profile, according to an example embodiment.

In embodiments, when the user logs into HSD management application 126 and selects a hair styling device, the corresponding status profile automatically is obtained and displayed. Alternatively, or at any time the user is logged in, the user may request the status profile. Accordingly, in embodiments, a status manager, such as status determiner 134, is configured to generate and transmit a status profile as part of a status message of a hair styling device. Status determiner 134 may perform this coordination in various ways. For instance, FIG. 8 shows a flowchart 800 for generating a status message including a status profile, according to an example embodiment. In an embodiment, flowchart 800 may be implemented by status determiner 134. FIG. 8 is described as follows with continued reference to system 100 in FIG. 1B and FIG. 7. Other structural and operational embodiments will be apparent to persons skilled in the relevant art(s) based on the following discussion regarding flowchart 800 and system 100.

Flowchart 800 begins with step 802. In step 802, a request for a status profile regarding the hair styling device is received. For example, with reference to FIG. 1B, status determiner 134 receives a request for a status profile regarding the hair styling device from a status monitor 148 via status manager 144.

In step 804, a status of at least one operational characteristic of the hair styling device to include in the status profile is determined. For instance, with reference to FIG. 1B and FIG. 7, status determiner 134 determines operational characteristics of hair styling device 102 to include in the status profile. In embodiments, the operational characteristics of the hair styling device may include an on/off status, an amount of time the hair styling device has been powered on, a time the hair styling device was powered on, the temperature of the heating element or the exposed heating surface, or the like.

In step 806, a status message that includes the status profile is generated for transmission over the network to the HSD management application. For instance, with reference to FIG. 1B and FIG. 7, status determiner 134 generates status message 702 that includes the status profile. Status message 702 is then transmitted to HSD management application 126 via network 160.

As described above, a user is enabled to control the paired hair styling device. For instance, a hair styling device manager, such as hair styling device manager 150 of FIG. 1B, receives and transmits a modification to an operation of hair styling device 102 to control circuit 130 via modification manager.

Figure 9:
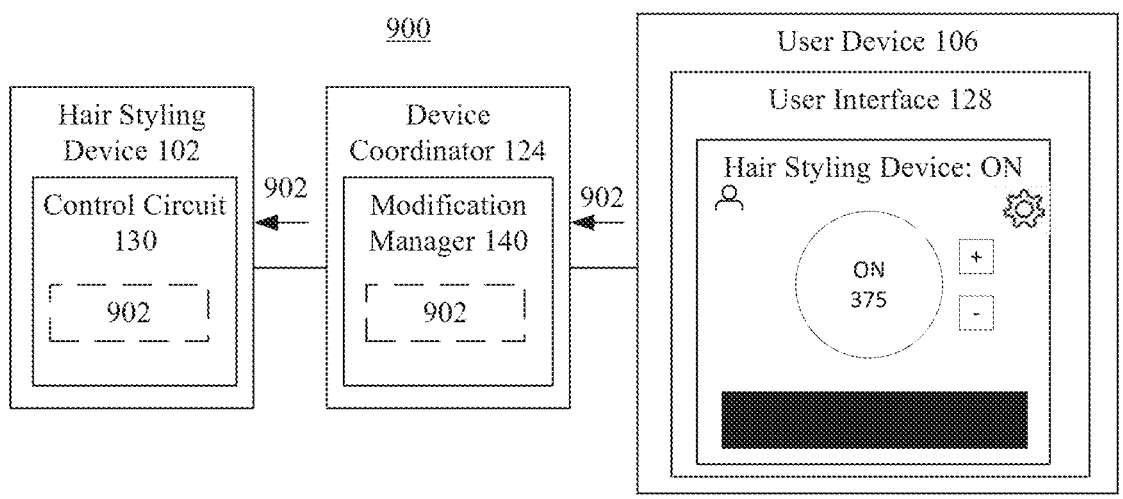
FIG. 9 shows a block diagram of a system that includes a user device, device coordinator, and a hair styling device in which the user device is enabled to transmit instructions to the paired hair styling device, according to an example embodiment.

For instance, FIG. 9 shows a block diagram 900 in which a user device is enabled to transmit instructions to a paired hair styling device, according to an example embodiment. As shown in FIG. 9, user device 106 includes user interface 128 which displays the interface of FIG. 7 for viewing the status of hair styling device 102 showing a user input using the slider interface to indicate the hair styling device be powered off. Accordingly, in response to receiving an input to turn off hair styling device 102 from the user via user interface 128, hair styling device manager 150 transmits powered-off notification 902 to modification manager. As shown in FIG. 9, hair styling device manager 150 receives powered-off notification 902 from the user via user interface 128 and transmits powered-off notification 902 to control circuit 130 via modification manager 140. Modification manager then transmits powered-off notification 902 to control circuit 130 of hair styling device 102. Control circuit 130 analyzes powered-off notification 902 to determine one or more corresponding control signal(s) to be sent to heating element 112. For example, and as shown in FIG. 9, control circuit 130 initiates a control signal that corresponds to powered-off notification 902. Control circuit 130 may be configured in various ways.

Figure 10:
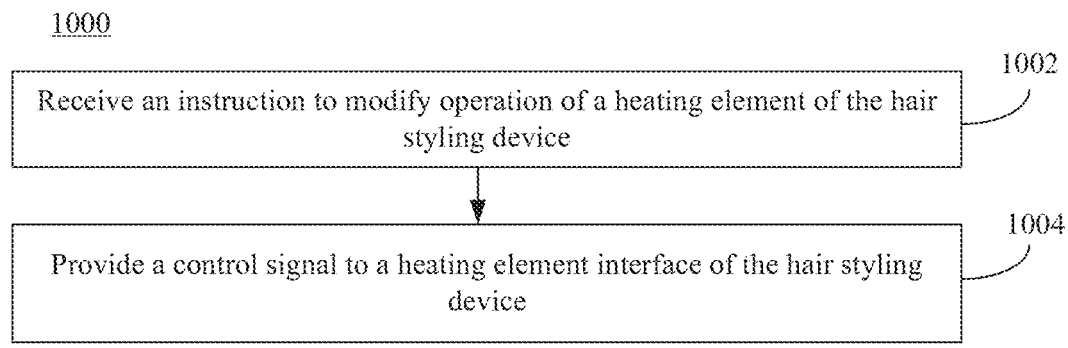
FIG. 10 shows a flowchart of a process for providing a control signal to a heating element of a hair styling device, according to an example embodiment.

For instance, FIG. 10 shows a flowchart 1000 for providing a control signal to a heating element of a hair styling device, according to an example embodiment. In an embodiment, flowchart 1000 may be implemented by control circuit 130. FIG. 10 is described as follows with continued reference to system 100 in FIG. 1B. Other structural and operational embodiments will be apparent to persons skilled in the relevant art(s) based on the following discussion regarding flowchart 1000 and system 100.

Flowchart 1000 begins with step 1002. In step 1002, an instruction to modify operation of a heating element of the hair styling device is received. For example, with reference to FIG. 1B and FIG. 9, control circuit 130 receives powered-off notification 902 for heating element 112 from hair styling device manager 150 via modification manager 140.

In step 1004, a control signal is provided to a heating element interface of the hair styling device. For instance, with reference to FIG. 1B, control circuit 130 provides a control signal to turn heating element 112 off via heating element interface 116.

Furthermore, and as noted above, when hair styling device 102 receives a modification notification, a result signal is transmitted to user device 106 for display to the user via user interface 128. For instance, if the control signal indicates that heating element 112 should be turned off or down in temperature, temperature sensor 162 determines that the temperature of heating element 112 decreased or was turned off and thus, command status monitor 132 generates a success result. Alternatively, if temperature sensor 162 determines that the temperature of heating element 112 remained the same, command status monitor 132 generates a fail result.

Figure 11:
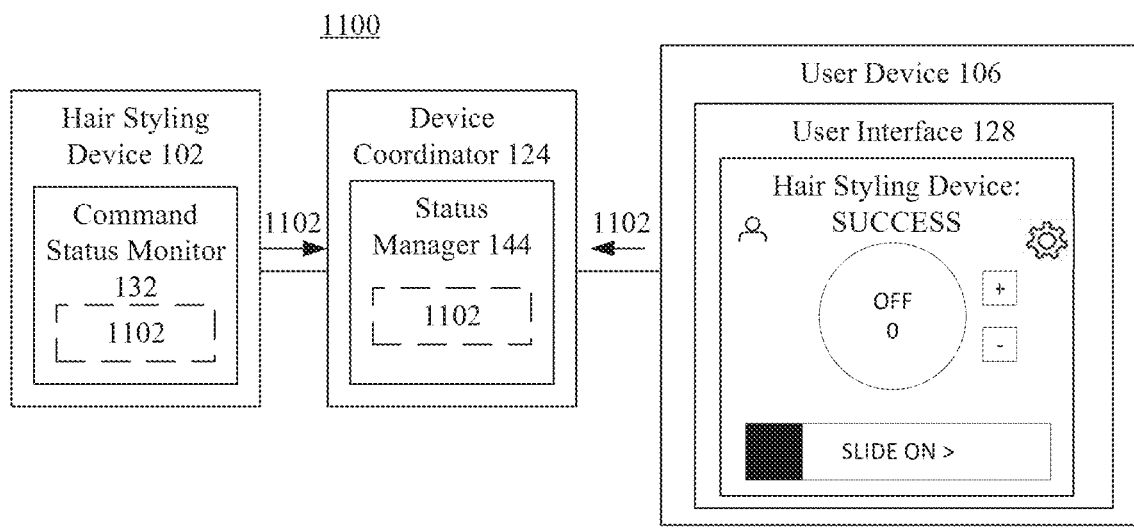
FIG. 11 shows a block diagram of a system that includes a user device, device coordinator, and a hair styling device in which a result message is transmitted to the user device, according to an example embodiment.

For instance, FIG. 11 shows a block diagram 1100 in which a result message is transmitted to a user device, according to an example embodiment. As shown in FIG. 11, command status monitor 132 generates a success message 1102 in response to powered-off notification 902. Command status monitor 132 then transmits success message 1102 to status manager 144 for transmission to status monitor 148 for display to the user. For instance, as shown in FIG. 11, user device 106 includes user interface 128 which displays the interface for viewing the status of hair styling device 102 showing a success status message. For instance, as shown in FIG. 11, the interface page may include the following fields: a result signal display, the ON/OFF status, a temperature+/− buttons, an interactive and current temperature, an account button, a help button, and an interactive slider slid to turn off. Command status monitor 132 may be configured in various ways.

For instance, FIG. 12 shows a flowchart 1200 for generating a success or fail message for a hair styling device, according to an example embodiment. In an embodiment, flowchart 1200 may be implemented by command status monitor 132. FIG. 12 is described as follows with continued reference to system 100 in FIG. 1B. Other structural and operational embodiments will be apparent to persons skilled in the relevant art(s) based on the following discussion regarding flowchart 1200 and system 100.

Flowchart 1200 begins with step 1202. In step 1202, a success or fail message indicative of a success or failure of the instruction in the hair styling device is generated for transmission over the network to the HSD management application. For example, with reference to FIG. 1B and FIG. 11, command status monitor 132 generates success message 1102 for transmission to HSD management application 106 via status manager 144. HSD management application 106 may display the success or failure indicated by success message 1102 in user interface 128.

As noted above, operational characteristics for the status profile may be determined by hair styling device 102 in various ways. For instance, FIG. 13 shows a flowchart 1300 for determining an on/off status of a hair styling device, according to an example embodiment. In an embodiment, flowchart 1300 may be implemented by on/off sensor 108. FIG. 13 is described as follows with continued reference to system 100 in FIG. 1B. Other structural and operational embodiments will be apparent to persons skilled in the relevant art(s) based on the following discussion regarding flowchart 1300 and system 100.

Flowchart 1300 begins with step 1302. In step 1302, an on/off status of the hair styling device is determined indicating at least one of an indication of whether the hair styling device is powered on, or an amount of time the hair styling device has been powered on. For example, with reference to FIG. 1B, on/off sensor 108 determines an on/off status of hair styling device 102. Furthermore, on/off sensor 108 determines an amount of time the hair styling device has been powered on. As described above, this on/off status may be transmitted to HSD management application 126 (via cloud interface 104) for display in user interface 128. Furthermore, as described above, this on/off status may be used to automatically power off hair styling device 102 in some situations (e.g., hair styling device not used for a predetermined amount of time, etc.).

Furthermore, and as noted above, a location may be obtained by the hair styling device (e.g., by location sensor 164) to implement location based alerts and/or automatic reactions. The determined location of the hair styling device may be compared to the location of the user device and if it is determined that the distance between the two exceeds a predetermined distance, the system may react in various ways. For instance, the user may receive a distance alert. Alternatively, or additionally, a power-off notification may be transmitted to the hair styling device.

FIG. 14 shows a flowchart 1400 for obtaining a location of a hair styling device, according to an example embodiment. In an embodiment, flowchart 1400 may be implemented by location sensor 164. FIG. 14 is described as follows with continued reference to system 100 in FIG. 1B. Other structural and operational embodiments will be apparent to persons skilled in the relevant art(s) based on the following discussion regarding flowchart 1400 and system 100.

Flowchart 1400 begins with step 1402. In step 1402, a location of the hair styling device is obtained. For example, with reference to FIG. 1B, location sensor 164 determines a location of hair styling device 102. Location sensor 164 may further transmit the location to location manager 142 at cloud interface 104 to use in an exceeded distance determination, or in any other manner. For example, location manager 142 may transmit the determined location of hair styling device 102 to user device 106 for display in user interface 128 (e.g., in a map generated by HSD management application 124 or a mapping application).

III. Example Computer System Implementations

Hair styling device 102, cloud interface 104, user device 106, device coordinator 124, any of the components of hair styling device 102, device coordinator 124, and user device 106 shown in FIG. 1B, flowchart 600, flowchart 800, flowchart 1000, flowchart 1200, flowchart 1300, and/or flowchart 1400 may be implemented in hardware, or hardware combined with software and/or firmware, including being implemented as computer program code/instructions configured to be executed in one or more processors and stored in a computer readable storage medium, as hardware logic/electrical circuitry, being implemented together in a SoC, such as an SoC that includes an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 15:
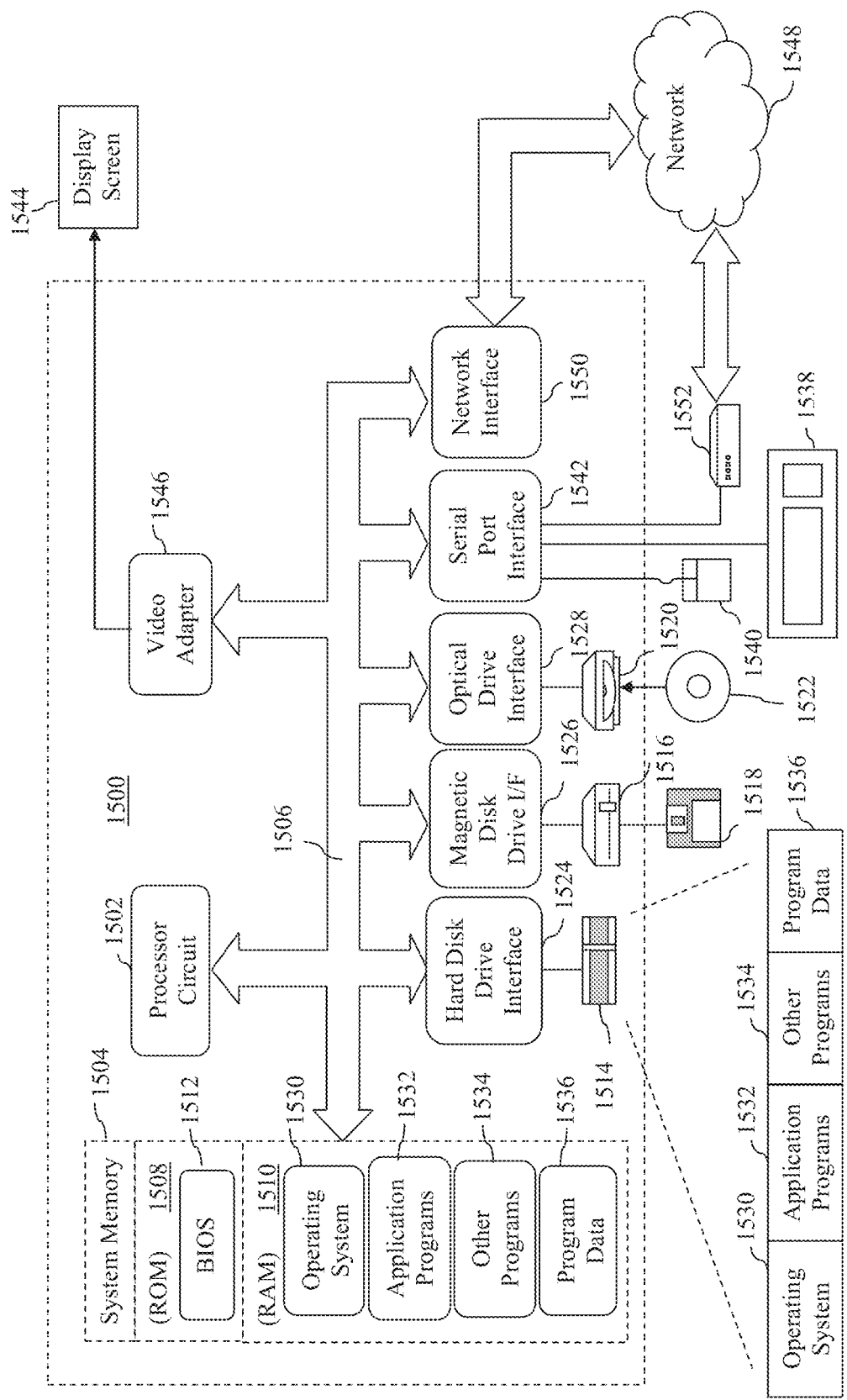
FIG. 15 is a block diagram of an example processor-based system that may be used to implement various embodiments described herein.

Furthermore, FIG. 15 depicts an exemplary implementation of a computing device 1500 in which embodiments may be implemented. For example, hair styling device 102, user device 106, and/or cloud interface 104 may be implemented in one or more computing devices similar to computing device 1500 in mobile or stationary embodiments, including one or more features of computing device 1500 and/or alternative features. The description of computing device 1500 provided herein is provided for purposes of illustration, and is not intended to be limiting. Embodiments may be implemented in further types of computer systems, as would be known to persons skilled in the relevant art(s).

As shown in FIG. 15, computing device 1500 includes one or more processors, referred to as processor circuit 1502, a system memory 1504, and a bus 1506 that couples various system components including system memory 1504 to processor circuit 1502. Processor circuit 1502 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1502 may execute program code stored in a computer readable medium, such as program code of operating system 1530, application programs 1532, other programs 1534, etc. Bus 1506 represents one or more of any of several types of bus structures, including a memory bus or memory controller, a peripheral bus, an accelerated graphics port, and a processor or local bus using any of a variety of bus architectures. System memory 1504 includes read only memory (ROM) 1508 and random access memory (RAM) 1510. A basic input/output system 1512 (BIOS) is stored in ROM 1508.

Computing device 1500 also has one or more of the following drives: a hard disk drive 1514 for reading from and writing to a hard disk, a magnetic disk drive 1516 for reading from or writing to a removable magnetic disk 1518, and an optical disk drive 1520 for reading from or writing to a removable optical disk 1522 such as a CD ROM, DVD ROM, or other optical media. Hard disk drive 1514, magnetic disk drive 1516, and optical disk drive 1520 are connected to bus 1506 by a hard disk drive interface 1524, a magnetic disk drive interface 1526, and an optical drive interface 1528, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1530, one or more application programs 1532, other programs 1534, and program data 1536. Application programs 1532 or other programs 1534 may include, for example, computer program logic (e.g., computer program code or instructions) for implementing hair styling device 102, cloud interface 104, user device 106, device coordinator 124, any of the components of hair styling device 102, device coordinator 124, and user device 106 shown in FIG. 1B, flowchart 600, flowchart 800, flowchart 1000, flowchart 1200, flowchart 1300, and/or flowchart 1400, and/or further embodiments described herein.

A user may enter commands and information into the computing device 1500 through input devices such as keyboard 1538 and pointing device 1540. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1502 through a serial port interface 1542 that is coupled to bus 1506, but may be connected by other interfaces, such as a parallel port, game port, or a universal serial bus (USB).

A display screen 1544 is also connected to bus 1906 via an interface, such as a video adapter 1546. Display screen 1544 may be external to or incorporated in computing device 1500. Display screen 1544 may display information, as well as being a user interface for receiving user commands and/or other information (e.g., by touch, finger gestures, virtual keyboard, etc.). In addition to display screen 1544, computing device 1500 may include other peripheral output devices (not shown) such as speakers and printers.

Computing device 1500 is connected to a network 1548 (e.g., the Internet) through an adaptor or network interface 1550, a modem 1552, or other means for establishing communications over the network. Modem 1552, which may be internal or external, may be connected to bus 1506 via serial port interface 1542, as shown in FIG. 15, or may be connected to bus 1506 using another interface type, including a parallel interface.

As used herein, the terms "computer program medium," "computer-readable medium," and "computer-readable storage medium" are used to refer to physical hardware media such as the hard disk associated with hard disk drive 1514, removable magnetic disk 1518, removable optical disk 1522, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data modulated in a data signal such as a carrier wave. The term "modulated data signal" means a signal that has one or more of its characteristics set or changed in such a manner as to encode information in the signal. Communication media embodies wireless media including acoustic, RF, infrared and other wireless media, as well as wired media. Embodiments are also directed to such communication media that are separate and non-overlapping with embodiments directed to computer-readable storage media.

As noted above, computer programs and modules (including application programs 1532 and other programs 1534) may be stored on the hard disk, magnetic disk, optical disk, ROM, RAM, or other hardware storage medium. Such computer programs may also be received via network interface 1550, serial port interface 1542, or any other interface type. Such computer programs, when executed or loaded by an application, enable computing device 1500 to implement features of embodiments discussed herein. Accordingly, such computer programs represent controllers of the computing device 1500.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Exemplary Embodiments

A hair styling device is described herein. The hair styling device comprises an exposed heating surface, a heating element configured to heat the exposed heating surface, a temperature sensor configured to measure a temperature of at least one of the heating element or the exposed heating surface, a heating element interface coupled to the heating element, a network communication circuit, and a device controller that includes a control circuit configured to provide a control signal to the heating element interface to modify operation of the heating element according to an instruction received by the network communication circuit over a network from an application.

In one embodiment of the foregoing hair styling device, the device controller further comprises: a command status monitor configured to generate a success or fail message, indicative of a success or failure of the instruction in the hair styling device, for transmission by the network communication circuit over the network to the application.

In another embodiment of the foregoing hair styling device, the device controller further comprises a status manager configured to, in response to a request for a status profile regarding the hair styling device: determine a status of at least one operational characteristic of the hair styling device to include in the status profile, and generate a status message, that includes the status profile, for transmission by the network communication circuit over the network to the application.

In yet another embodiment of the foregoing hair styling device, the hair styling device further comprises at least one of: an on/off sensor configured to determine an on/off status of the hair styling device indicating at least one of: an indication of whether the hair styling device is powered on, or an amount of time the hair styling device has been powered on; or a location sensor configured to obtain a location of the hair styling device.

In yet another embodiment of the foregoing hair styling device, the status profile indicates at least one of: the on/off status of the hair styling device; the temperature of at least one of the heating element or the exposed heating surface; or the location of the hair styling device.

In yet another embodiment of the foregoing hair styling device, the hair styling device further comprises: a network connection configurer configured to: receive, via the network communication circuit, a pair request indicating a request to pair the hair styling device with a user device that contains the application; transmit, to the user device, via the network communication circuit, a hair styling device identifier specific to the hair styling device; and receive from the user device, via the network communication circuit, network communication connection information for the network, wherein the network communication circuit is further configured to connect to the network based on the network communication connection information.

In yet another embodiment of the foregoing hair styling device, the hair styling device further comprises: a battery configured to provide the hair styling device with power while the hair styling device is disconnected from an external power source.

A computer-readable medium having program code recorded thereon defining an application configured to executed in a user device is disclosed herein. The program code comprises a status monitor configured to: receive, over a network, from a network communication circuit of the user device, a status profile corresponding to a hair styling device, the status profile at least indicating an on/off status of the hair styling device, and display the status profile in a user interface of the user device; and a hair styling device manager configured to: receive an instruction input to the user interface to modify an operation of the hair styling device.

In another embodiment of the foregoing computer-readable medium, the hair styling device manager is further configured to: transmit the instruction to the hair styling device over the network using the network communication circuit of the user device; and receive, from the network communication circuit of the user device, a success or fail message indicative of a success or failure of the instruction at the hair styling device.

In yet another embodiment of the foregoing computer-readable medium, the status profile further indicates at least one of: a temperature associated with the hair styling device; an indication of whether the hair styling device is powered on; an amount of time the hair styling device has been powered on; or a location of the hair styling device.

In yet another embodiment of the foregoing computer-readable medium, the program code further comprises: a hair styling device connection configurer configured to: transmit to the hair styling device, over the network, via the network communication circuit, a pair request indicating a request to pair the hair styling device with the user device; receive from the hair styling device, over the network, via the network communication circuit, a hair styling device identifier specific to the hair styling device; receive network communication connection information for the network that was input to the user interface; and transmit to the hair styling device, over the network, via the network communication circuit, the network communication connection information.

In yet another embodiment of the foregoing computer-readable medium, the program code further comprises: a user configurer configured to: receive user account information that was input to the user interface; and transmit the user account information over the network to a server via the network communication circuit, the server configured to maintain the user account information in association with a hair styling device identifier specific to the hair styling device.

In yet another embodiment of the foregoing computer-readable medium, the hair styling device manager is further configured to: transmit a location of the user device to the server; and in response to receiving a distance exceeded alert indicating a distance of the user device from the hair styling device exceeds a predetermined distance, wherein the user configurer is configured to enable a user to set the predetermined distance using the user interface, perform one of the following: transmit the distance exceeded alert to the status monitor for display in the user interface; or transmit an off instruction to the hair styling device over the network using the network communication circuit of the user device, the off instruction comprising an instruction to turn off the hair styling device.

A method is described herein. The method comprises receiving from an application in a user device, over a network, an instruction to modify operation of a heating element of the hair styling device, the heating element configured to heat an exposed heating surface of the hair styling device; and providing a control signal corresponding to the instruction to a heating element interface coupled to the heating element.

In an embodiment of the foregoing method, the method further comprises generating a success or fail message indicative of a success or failure of the instruction in the hair styling device; and transmitting the success or fail message over the network to the application in the user device.

In yet another embodiment of the foregoing method, the method further comprises receiving a request for a status profile regarding the hair styling device; determining a status of at least one operational characteristic of the hair styling device to include in the status profile; generating a status message, that includes the status profile; and transmitting the status message over the network to the application in the user device.

In yet another embodiment of the foregoing method, the method further comprises at least one of: determining an on/off status that indicates at least one of: an indication of whether the hair styling device is powered on, or an amount of time the hair styling device has been powered on; or determining a location of the hair styling device.

In yet another embodiment of the foregoing method, the status profile indicates at least one of: the on/off status of the hair styling device; the temperature of at least one of the heating element or the exposed heating surface; or the location of the hair styling device.

In yet another embodiment of the foregoing method, the method further comprises receiving a pair request indicating a request to pair the hair styling device with a user device that includes the application; transmitting a hair styling device identifier specific to the hair styling device; and receiving network communication connection information for the network, wherein the network communication circuit is configured to connect to the network based on the network communication connection information.

In yet another embodiment of the foregoing method, the method further comprises providing the hair styling device with power while the hair styling device is disconnected from an external power source.

V. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A hair styling device, comprising:
    an exposed heating surface;
    a heating element configured to heat the exposed heating surface;
    a temperature sensor configured to measure a temperature of at least one of the heating element or the exposed heating surface;
    a heating element interface coupled to the heating element and configured to cause the heating element to heat the exposed heating surface in response to a received control signal;
    a network communication circuit configured to receive, over a network, an instruction to modify operation of the heating element from an application in a user device;
    a location sensor configured to obtain a location of the hair styling device;
    a device controller that includes:
        a control circuit configured to provide the control signal to the heating element interface to modify operation of the heating element according to the instruction; and
        a status manager configured to, in response to a request for a status profile regarding the hair styling device:
            determine a status of at least one operational characteristic of the hair styling device, and
            generate a status message, which includes the determined status and the obtained location, for transmission by the network communication circuit over the network to the application.

2. The hair styling device of claim 1, wherein the device controller further comprises:
    a command status monitor configured to generate a success or fail message, indicative of a success or failure of the instruction in the hair styling device, for transmission by the network communication circuit over the network to the application.

3. The hair styling device of claim 1, further comprising:
    an on/off sensor configured to determine an on/off status of the hair styling device indicating at least one of:
        an indication of whether the hair styling device is powered on, or
        an amount of time the hair styling device has been powered on.

4. The hair styling device of claim 3, wherein the determined status indicates at least one of:
    the on/off status of the hair styling device; or
    the temperature of at least one of the heating element or the exposed heating surface.

5. The hair styling device of claim 2, wherein the hair styling device further comprises:
    a network connection configurer configured to:
        receive, via the network communication circuit, a pair request indicating a request to pair the hair styling device with a user device that contains the application;
        transmit, to the user device, via the network communication circuit, a hair styling device identifier specific to the hair styling device; and
        receive from the user device, via the network communication circuit, network communication connection information for the network, wherein the network communication circuit is further configured to connect to the network based on the network communication connection information.

6. The hair styling device of claim 1, wherein the hair styling device further comprises:
    a battery configured to provide the hair styling device with power while the hair styling device is disconnected from an external power source.

7. A non-transitory computer-readable medium having program code recorded thereon defining an application configured to execute in a user device, the program code comprising:
    a status monitor configured to:
        receive, over a network, from a network communication circuit of the user device, a status profile corresponding to a hair styling device, the status profile at least indicating an on/off status of the hair styling device and a location of the hair styling device, and
        display the status profile in a user interface of the user device; and
    a hair styling device manager configured to:
        receive an instruction input to the user interface to modify an operation of a heating element of the hair styling device, the heating element configured to heat an exposed heating surface of the hair styling device; and
        transmit the instruction to the hair styling device over the network using the network communication circuit, the instruction causing, at the hair styling device, a control signal corresponding to the instruction to be provided to a heating element interface coupled to the heating element.

8. The computer-readable medium of claim 7, wherein the hair styling device manager is further configured to:
    receive, from the network communication circuit of the user device, a success or fail message indicative of a success or failure of the instruction at the hair styling device.

9. The computer-readable medium of claim 7, wherein the status profile further indicates at least one of:
    a temperature associated with the hair styling device;
    an indication of whether the hair styling device is powered on; or
    an amount of time the hair styling device has been powered on.

10. The computer-readable medium of claim 7, wherein the program code further comprises:
    a hair styling device connection configurer configured to:
        transmit to the hair styling device, over the network, via the network communication circuit, a pair request indicating a request to pair the hair styling device with the user device;
        receive from the hair styling device, over the network, via the network communication circuit, a hair styling device identifier specific to the hair styling device;
        receive network communication connection information for the network that was input to the user interface; and
        transmit to the hair styling device, over the network, via the network communication circuit, the network communication connection information.

11. The computer-readable medium of claim 7, wherein the program code further comprises:
    a user configurer configured to:
        receive user account information that was input to the user interface; and
        transmit the user account information over the network to a server via the network communication circuit, the server configured to maintain the user account information in association with a hair styling device identifier specific to the hair styling device.

12. The computer-readable medium of claim 11, wherein the hair styling device manager is further configured to:
transmit a location of the user device to the server; and
in response to receiving a distance exceeded alert indicating a distance of the user device from the hair styling device exceeds a predetermined distance, wherein the user configurer is configured to enable a user to set the predetermined distance using the user interface, perform one of the following:
 transmit the distance exceeded alert to the status monitor for display in the user interface; or
 transmit an off instruction to the hair styling device over the network using the network communication circuit of the user device, the off instruction comprising an instruction to turn off the hair styling device.

13. A method in a hair styling device, comprising:
receiving from an application in a user device, over a network, a request for a status profile regarding the hair styling device;
determining a status of at least one operational characteristic of the hair styling device;
determining a location of the hair styling device;
generating a status message that includes the determined status and the determined location;
transmitting the status message over the network to the application in the user device;
receiving, from the application in the user device, an instruction to modify operation of a heating element of the hair styling device, the heating element configured to heat an exposed heating surface of the hair styling device; and
providing a control signal corresponding to the instruction to a heating element interface coupled to the heating element.

14. The method of claim 13, further comprising:
determining an on/off status that indicates at least one of:
 an indication of whether the hair styling device is powered on, or
 an amount of time the hair styling device has been powered on.

15. The method of claim 14, wherein the status profile further indicates at least one of:
the on/off status of the hair styling device; or
the temperature of at least one of the heating element or the exposed heating surface.

16. The method of claim 13, further comprising:
receiving a pair request indicating a request to pair the hair styling device with the user device that includes the application;
transmitting a hair styling device identifier specific to the hair styling device; and
receiving network communication connection information for the network, wherein the network communication circuit is configured to connect to the network based on the network communication connection information.

17. The method of claim 13, further comprising:
providing the hair styling device with power while the hair styling device is disconnected from an external power source.

18. The method of claim 13, further comprising:
generating a success or fail message indicative of a success or failure of the instruction in the hair styling device; and
transmitting the success or fail message over the network to the application in the user device.

19. The method of claim 13, further comprising:
receiving a location of the user device;
determining a distance exceeded alert indicating a distance of the user device from the hair styling device exceeds a predetermined distance; and
transmitting the distance exceeded alert.

20. The hair styling device of claim 1, wherein the network communication circuit is configured to receive, over the network, an off instruction comprising an instruction to turn off the hair styling device; and
 the control circuit is configured to provide a control signal to the heating element interface, in response to the off instruction, that is configured to turn off the heating element.

\* \* \* \* \*